United States Patent
Curbera et al.

(10) Patent No.: US 9,372,736 B2
(45) Date of Patent: Jun. 21, 2016

(54) LEVERAGING PATH INFORMATION TO GENERATE PREDICTIONS FOR PARALLEL BUSINESS PROCESSES

(71) Applicant: INTERNATIONAL BUSINESS MACHINES CORPORATION, Armonk, NY (US)

(72) Inventors: Francisco Curbera, Yorktown Heights, NY (US); Yurdaer N. Doganata, Chesnut Ridge, NY (US); Geetika T. Lakshmanan, Winchester, MA (US); Merve Unuvar, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 14/271,132

(22) Filed: May 6, 2014

(65) Prior Publication Data

US 2015/0324241 A1    Nov. 12, 2015

(51) Int. Cl.
*G06F 9/46* (2006.01)
*G06F 9/52* (2006.01)
*G06F 11/34* (2006.01)
*G06F 11/36* (2006.01)

(52) U.S. Cl.
CPC ............. *G06F 9/52* (2013.01); *G06F 11/3466* (2013.01); *G06F 11/3636* (2013.01)

(58) Field of Classification Search
None
See application file for complete search history.

(56) References Cited

U.S. PATENT DOCUMENTS

| | | | | |
|---|---|---|---|---|
| 6,112,299 A * | 8/2000 | Ebcioglu | ............. | G06F 9/30058 711/127 |
| 7,047,395 B2 * | 5/2006 | Rosner | ................. | G06F 9/3802 712/215 |
| 7,571,069 B1 * | 8/2009 | Farkas | ................... | G06Q 10/06 702/119 |
| 8,589,331 B2 * | 11/2013 | Duan | ..................... | G06N 5/048 706/52 |
| 8,640,132 B2 * | 1/2014 | Berstis | .................. | G06F 9/4881 718/102 |
| 8,966,457 B2 * | 2/2015 | Ebcioglu | ............ | G06F 17/5045 716/105 |
| 9,053,437 B2 * | 6/2015 | Adler | ...................... | G06Q 10/00 |
| 2005/0278301 A1 * | 12/2005 | Castellanos | ......... | G06F 17/5009 |
| 2008/0130951 A1 * | 6/2008 | Wren | ....................... | H04N 7/18 382/103 |
| 2010/0114629 A1 * | 5/2010 | Adler | ..................... | G06Q 10/00 705/7.36 |
| 2012/0066166 A1 * | 3/2012 | Curbera | ................. | G06N 7/005 706/52 |
| 2012/0101974 A1 | 4/2012 | Duan et al. | | |
| 2013/0103441 A1 | 4/2013 | Doganata et al. | | |
| 2015/0019298 A1 * | 1/2015 | Curbera | .......... | G06Q 10/06375 705/7.37 |
| 2015/0127589 A1 * | 5/2015 | Lakshmanan | ........ | G06N 99/005 706/12 |

OTHER PUBLICATIONS

Hamou-Lhadj et al. "Compression Techniques to Simplify the Analysis of Large Execution Traces", 2002 IEEE, 10 pages.*

(Continued)

*Primary Examiner* — Van Nguyen
(74) *Attorney, Agent, or Firm* — Tutunjian & Bitetto, P.C.; Nidhi Kissoon

(57) ABSTRACT

Systems and methods for determining a representation of an execution trace include identifying at least one execution trace of a business process model, the business process model including parallel paths where a path influences an outcome of a decision. Path information of the business process model is determined using a processor, the path information including at least one of task execution order for each parallel path, task execution order across parallel paths, and dependency between parallel paths. A path representation for the at least one execution trace is selected based upon the path information to determine a representation of the at least one execution trace.

20 Claims, 4 Drawing Sheets

| ID | Token 1 | Token 2 | Token 3 | Email Offer Read | Voicemail | # calls | Customer Age | Gender | Output |
|---|---|---|---|---|---|---|---|---|---|
| 1 | AB | ACF | AD | N | N | 1 | 76 | F | J |
| 2 | ABE | ACF | AD | Y | Y | 2 | 29 | M | J |
| 3 | ABEF | ACF | ADG | Y | Y | 5 | 24 | M | I |
| 4 | ABF | ACG | ADHG | N | N | 2 | 63 | M | I |
| 5 | ABF | ACG | ADH | Y | Y | 4 | 38 | F | I |

(56) References Cited

OTHER PUBLICATIONS

Couchet al. "Portable Execution Traces for Parallel Program Debugging and Performance Visualization", 1992 IEEE, pp. 441-446.*
Hendriks al. "Reconstructing Critical Paths from Execution Traces", 2012 IEEE, pp. 524-531.*
Tune al. "Dynamic Prediction of Critical Path Instructions", 2001 IEEE, pp. 185-195.*
Chung al. "Improving Lookahead in Parallel Multiprocessor Simulation Using Dynamic Execution Path Prediction", 2006 IEEE, 8 pages.*
Lakshmanan, G., et al. "Leveraging Process Mining Techniques to Analyze Semi-Structured Processes" IT Professional, vol. 15, No. 5. Sep. 2013. pp 1-13.
Mitchel, T. "Chapter 3: Decision Tree Learning" Machine Learning. Mar. 1997. pp. 52-80.

* cited by examiner

| ID | Token 1 | Token 2 | Token 3 | Email Offer Read | Voicemail | # calls | Customer Age | Gender | Output |
|---|---|---|---|---|---|---|---|---|---|
| 1 | AB | ACF | AD | N | N | 1 | 76 | F | J |
| 2 | ABE | ACF | AD | Y | Y | 2 | 29 | M | J |
| 3 | ABEF | ACF | ADG | Y | Y | 5 | 24 | M | I |
| 4 | ABF | ACG | ADHG | N | N | 2 | 63 | M | I |
| 5 | ABF | ACG | ADH | Y | Y | 4 | 38 | F | I |

LEVERAGING PATH INFORMATION TO GENERATE PREDICTIONS FOR PARALLEL BUSINESS PROCESSES

BACKGROUND

1. Technical Field

The present invention relates to business processes, and more particularly to leveraging path information to generate predictions for parallel business processes.

2. Description of the Related Art

An execution path of a business process instance refers to the sequence of tasks executed in that instance. Consider, for example, an execution trace of an instance having execution paths that influence the outcome of decision points in a process. Suppose that users wish to know (both intermediate and final) outcomes of an instance of such a business process as the instance is executing. In this scenario, the path is modeled as an attribute to train a predictive model. The predictive model can be used to predict outcomes for an instance of the process. However, there are several choices on how to represent the path attribute. Selecting an appropriate model to represent the path attribute impacts the accuracy and efficiency of other processes that rely on the path representation.

SUMMARY

A method for determining a representation of an execution trace includes identifying at least one execution trace of a process model, the process model including parallel paths where a path influences an outcome of a decision. Path information of the process model is determined using a processor, the path information including at least one of: task execution order for each path in the at least one execution trace, task execution order across parallel paths, and dependency between parallel paths. A path representation for the at least one execution trace is selected based upon the path information to determine a representation of the at least one execution trace.

A system for determining a representation of an execution path includes a determination module configured to identify at least one execution trace of a process model, the process model including parallel paths where a path influences an outcome of a decision. The determination module is further configured to determine path information of the process model using a processor, the path information including at least one of task execution order for each path in the at least one execution trace, task execution order across parallel paths, and dependency between parallel paths. A selection module is configured to select a path representation for the at least one execution trace based upon the path information to determine a representation of the at least one execution trace.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 3 is an exemplary sample training dataset, in accordance with one illustrative embodiment.

DETAILED DESCRIPTION OF PREFERRED EMBODIMENTS

Figure 1:
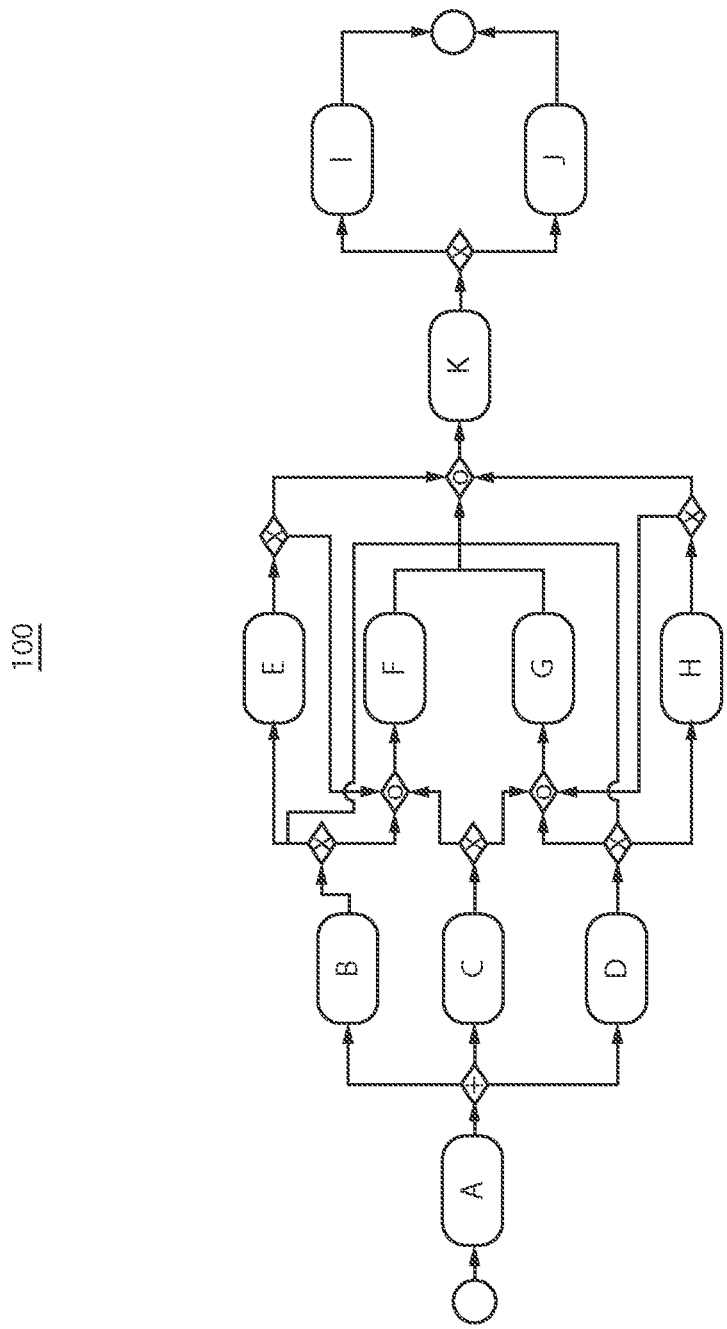
FIG. 1 is an exemplary business process model, in accordance with one illustrative embodiment.

In accordance with the present principles, systems and methods for leveraging path information to generate predictions for parallel business processes is provided. A number of path representations are provided as, e.g., Models A-E, which are explained below. The present principles provide for a methodology for selecting an appropriate model to represent the execution trace based on path information, which includes, e.g., task execution order on each particular parallel path in an execution trace, executing path information, which identifies the parallel path associated with a task (to provide an execution order of tasks across parallel paths), and/or a dependency between parallel paths in the business process model.

In one particularly useful embodiment, paths may be identified as independent paths and dependent path groups. Independent paths are encoded as a single attribute with executing path information (Model A). Executing path information is the information that indicates the parallel path that a task is executed on, and thus the task execution order across parallel paths. Dependent path groups are encoded as multiple attributes with task execution order on each parallel path (Model B).

Preferably, dependent path groups are encoded as both Model A and Model B. This is because training a decision tree with Model A results in numerous nodes, leading to a more complex decision tree than training with Model B. Because of this complexity associated with Model A, it is determined whether it is worthwhile to distinguish path independence in the path representation. Information gain is calculated for Model A and Model B to ensure that representation complexity is not increased unnecessarily by selecting Model A over Model B if there is no additional information.

The present principles select appropriate models to represent execution traces in business process models to provide accurate and efficient processes for different applications. For example, the present principles may be employed to select a path representation for an execution trace to train a classifier for predicting an outcome of a decision in the business process model. Other applications may also include deviation, clustering, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a process model or business process model 100 is illustratively depicted in accordance with one embodiment. The business process model 100 will first be discussed in the context of an overview of token generation to extract parallel path information.

An execution path (also referred to as an execution trace) in the business process model or process flow 100 is a possible way of connecting source and destination tasks. This can be visualized by representing the business process model as a directed graph. Let M denote the graph of the process model with V task (or activity, event, etc.) and gateway nodes, and E edges where each edge connects two nodes in M. Thus, the directed graph can be represented as M(V, E). The possible types of nodes include: start node, stop node, task node and gateway node. At each graph, there is only one start and one stop node and there can be several task and gateway nodes. Start node has a single outgoing edge, stop node has a single incoming edge, and task nodes have single incoming and single outgoing edges. A gateway node may be forking to or merging multiple paths depending on the conditions expressed. There are three gateway types, which can either be forking or merging: inclusive, exclusive, and parallel gateway.

In a business process model 100, there are many possible paths between a source task and destination task. Possible paths in a business process model 100 can be visualized by, e.g., injecting tokens in the business process model 100. The tokens trace active task nodes in the business process model 100 to represent the order of execution of tasks in each path and the order of execution of tasks across parallel paths in the business process model.

Depending on the node type, tokens injected in a business process model 100 will either be transferred, or replicated and then transferred. For example, if the node type is a task node, it will transfer all the tokens to its outgoing edge once the task performs its duties. If the node type is an inclusive gateway (e.g., forking or merging), any token that arrives to that node is transferred. If the node type is an exclusive gateway, only the first token that hits that gateway will be transferred.

The replication of tokens (i.e., new token generation) takes place on parallel gateway nodes where the process forks. In that case, new tokens will be generated. The number of new tokens will be the same as the number of outgoing edges, and each new token will be transferred to each one of these outgoing edges. In order to keep track of token types, tokens are created with different IDs. If the node is a parallel gateway where the process merges, then the node has to wait for all the tokens that incoming arcs bring to that parallel gateway to transfer its outgoing edge. The flow starts with the generation of a single token on the start node of the business process model. If there are no parallel gateways where the process forks, then there is always going to be a single token flowing through the whole process. The total number of tokens depends on the semantics of the graph, the number of parallel gateways where the process forks, and the number of outgoing edges of each parallel gateway where the process forks.

In the case of parallel execution paths, multiple tokens are generated in the business process model. Obtaining complete execution information involves capturing the trace of each individual token. For example, in the business process model 100 of FIG. 1, after activity A, a single token hits a parallel gateway that forks to three different outgoing edges and the single token is multiplied into three tokens: the first goes to activity B, the second to activity C, and the third to activity D. Task K is a decision point, which can lead to outcomes of activity I or activity J. A decision or decision point in a business process model 100 is a task where a decision splits exclusively into two or more outcomes based on, e.g., the path that is taken. Let {ABCDHEGK} denote a possible trace of an execution instance of business process model 100. If the trace includes the parallel paths ABE, ACG, ADH, for tokens 1, 2 and 3 respectively, then the complete path information as a single path attribute with executing path information can be represented for this case as $\{AB_1C_2D_3H_3E_1G_2K\}$, where the subscripts identify the tokens, i.e., the parallel path on which a node is executed. $G_2$ denotes that the node G was executed on path 2, after $C_2$. Depending on the structure of the business process model (i.e., causal relationship between the parallel paths and availability of token information to identify the order of execution of tasks), there are different ways of including the token information into the trace.

Machine learning techniques, e.g., classifiers such as decision trees, are often used to predict future activities in a business process instances based on historical execution traces. Relevant attributes of the execution traces are used to train the machine learning against the outputs to be predicted. Execution path (also referred to as an execution trace) is one potential attribute that could be used for training. An execution path of a business process instance refers to the sequence of tasks executed in that instance of a business process model. For example, in business process model 100, an execution trace of an instance of this process could be: ABCDHEGKI.

A classifier can be trained as a predictive model using the execution traces. Different path representations are possible for representing each execution trace in training the classifier. The different path representations may be selected based on the path information available for that execution trace. The selection of the path representation of execution traces impacts the training of the predictive model since the path attribute changes for each representation. A path attribute refers to the entire execution path as recorded by an execution trace. The path representations depend on the availability of token information, which identifies the order of execution of tasks in each parallel path, the order of execution of tasks across parallel paths (executing path information), and the dependency between the parallel paths. Paths may be represented based on predictive models A-E, explained below. Other path representations may also be employed.

Model A: single path attribute with token information. Model A corresponds to the case where the order of execution of tasks across parallel paths is identifiable, e.g., via tokens, and paths are dependent. Model A uses a single attribute to represent the traces of all tokens on different parallel paths (i.e., represented as a single path of the execution trace). This is for cases where execution traces include information about the execution order across different paths that have casual relationships. The tasks are ordered according to execution times of each task, regardless of their path. In the process model 100 of FIG. 1, $P=AB_1C_2D_3H_3E_1G_2K$ is such a representation of a single path attribute with token information.

Model B: multiple path attributes with token information. Model B is similar to Model A, with the exception that Model B assumes that paths are independent. Model B uses separate path attributes for the trace of each parallel path. This representation is satisfactory for cases where parallel executions are known to be independent of each other, but are missing the cross dependency information (execution of tasks across parallel paths is unknown). The path representations for Model A, P, can be replaced by a triplet $\{P_1, P_2, P_3\}$, where $P_1$=ABE, $P_2$=ACG, $P_3$=ADH for cases when parallel paths flow independently. In this model, the execution order of each path is known, but no information is available regarding the task execution orders across parallel paths. That is, it is known that task E is executed after task B on path 1, but it is not known if task C on path 2 is executed before or after task B on path 1.

Model C: single path attribute without token information. Model C corresponds to the case where task execution order of each path is identifiable, but task execution order across parallel paths is not identifiable. Model C represents the case where executing path information is not identifiable and cannot be estimated. In this case, since the executing path information is missing, the execution trace without the executing path information is used. Model C uses a single path attribute but without executing path information. Using the same example, P, as in Model A, representation is given as T=ABCDHEGK in Model C (i.e., without the token information).

Model D: multiple path attributes with estimated token information. Model D corresponds to the case where task execution order on each parallel path is identifiable, however executing path information is not identifiable but can be estimated. Different from Model C, Model D assumes independence, like Model B, but uses estimated executing path information rather than actual. Since the execution traces do not include token information, the only possible way of capturing the path is the execution order of the tasks. Path representation without the token information is expected to be highly biased since information about parallel executions is not captured without tokens. In this case, the token that is executed by a particular task can be estimated. Model D is built by predicting the path attributes of $P_1$, $P_2$, $P_3$ or P with token information from execution trace history and by using the process model. Once the possible paths are identified, following the structure of the process model, probabilities are computed for every possible path. The path probability distribution is then used to estimate the most likely parallel path trace. Further detail of Model D may be found in commonly assigned U.S. patent application Ser. No. 13/939,362, filed Jul. 11, 2012, entitled ESTIMATING PATH INFORMATION IN BUSINESS PROCESS INSTANCES WHEN PATH INFORMATION INFLUENCES DECISION, incorporated herein by reference in its entirety.

Model E: list of executed tasks without any path information. Model E is the only model that ignores the execution order and just utilizes the information about the list of tasks that are executed. Model E is suitable as a fallback for the case where the only information available is the list of tasks that are executed without ordering. Model E encodes individual task execution as a Boolean or numeric attribute.

Figure 2:
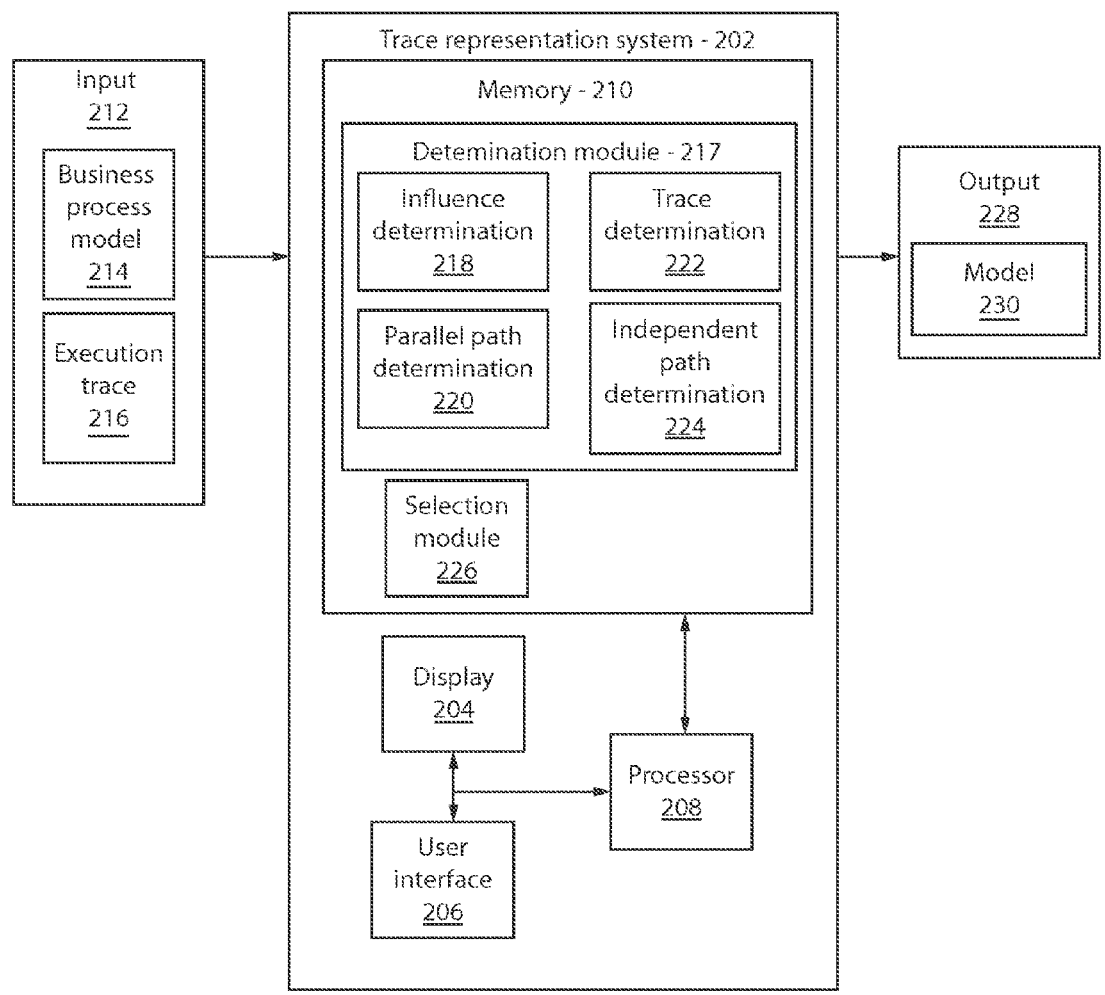
FIG. 2 is a block/flow diagram of a system for determining a model for representing an execution trace, in accordance with one illustrative embodiment.

Referring now to FIG. 2, a block/flow diagram showing a system for determining a model for representing an execution trace 200 is illustratively depicted in accordance with one embodiment. The system 200 determines an appropriate predictive model, e.g., Model A-E, for an execution trace of a business process model to, e.g., predict an outcome of a decision in the business process model, such as a decision, diagnosis, etc. Applications of the system 200 may include, e.g., government, insurance, banking, healthcare, etc. In each of these applications, it is helpful to be able to distinguish execution path representations via Models A-E, and it is helpful to utilize the methodology provided in this invention to determine which path representation to use.

The system 200 may include a system or workstation 202. The system 202 preferably includes one or more processors 208 and memory 210 for storing applications, modules and other data. The system 202 may also include one or more displays 204 for viewing. The displays 204 may permit a user to interact with the system 202 and its components and functions. This may be further facilitated by a user interface 206, which may include a mouse, joystick, or any other peripheral or control to permit user interaction with the system 202 and/or its devices. It should be understood that the components and functions of the system 202 may be integrated into one or more systems or workstations, or may be part of a larger system or workstation.

The system 202 may receive input 212, which may include a business process model 214 and execution traces 216 of the business process model 214. A trace of a business process model includes tasks, activities, events, etc. executed during the course of that business process model, and data and metadata associated with each task. Metadata associated with a task could include the timestamp at which the task began executing. Data associated with a task may be a value such as an Amount in Dollars (numeric type).

Memory 210 may include a determination module 217 and a selection module 230. The determination module 217 may include influence determination module 218, parallel path determination module 220, trace determination module 222, independence determination module 224 and selection module 226. The determination module 217 is configured to determine path information of the business process model 214. Preferably, path information includes at least one of: an execution order of tasks on each parallel path, an execution order of tasks across parallel paths, and/or a dependency between the parallel paths. Selection module 226 is configured to select a path representation, such as, e.g., model A-E, to represent the execution trace 216 of the business process model 214 based on the path information determined by the modules of the determination module 217. Other models may also be employed.

The influence determination module 218 is configured to determine whether a path influences an outcome of a decision (i.e., whether there is a causal relationship between paths in the business process model 214). Preferably, the causal relationship between paths in the business process model 214 is received as part of input 212 from the user. The causal relationship between paths would indicate that that a specific path taken in the business process model 214 influences an outcome of a subsequent decision. The task execution order of a single instance of a parallel business process model may correspond to multiple realizations. Even if the execution order of the tasks is the same for all realizations, the execution trace may embody different paths. For instance, in the business process model 100, paths $P_1$={A, $B_1$, $C_2$, $F_2$, K} and $P_2$={A, $B_1$, $C_2$, $F_1$, K} are two realizations of trace {A, B, C, F, K}. In the first case, the process reaches task A via path 2 and through tasks C and F before task B completes. While in the second case, the process reaches K through tasks B and F via path 1. This may be important when an impending decision depends on the path of the execution trace in addition to the task execution order. In other words, execution of a task on one path may influence the execution of a task on another path.

Parallel path determination module 220 is configured to determine if parallel paths in the business process model 214 exist. Representing the path attribute for processes that do not have parallel paths is straightforward due to the causal relationship between two consecutive tasks. The execution sequence of tasks in an execution trace of a process instance that doesn't have any parallelism captures the process execution behavior uniquely. This is because tasks are executed sequentially one after another. This is not the case, however, for processes with parallel paths, where multiple tasks may be executed simultaneously.

Trace determination module 222 is configured to determine whether the order of execution of tasks in a particular parallel path is traceable and whether executing path information for parallel paths exists. Executing path information is the information that indicates the parallel path that a task is executed on, and thus the task execution order across parallel paths. In semi-structured processes, particularly case management and healthcare environments, it may not be possible to trace multiple parallel instances within a single instance via tokens. If this is the case, then it is not possible to identify the token associated with a given activity execution in the context of parallel path execution. On the other hand, if tokenized traces are available, each instance of a given activity execution can be identified via a token, e.g., $A_1, A_2$, etc. Overall, this has an impact on the quality of information that is provided to a classifier when training it with parallel paths. The prediction accuracy is affected if execution instances of the same activity within parallel path executions of a business process are not supplied while training a classifier to predict the outcome of a decision which is influenced by such a path. If the order of execution of tasks in parallel paths is not traceable, the trace determination module 222 is configured to estimate the order of execution of the tasks, if possible.

Independent path determination module 224 is configured to determine a dependency between parallel paths in the business process model 214 to identify independent paths and dependent path groups. In many practical cases, the process splits into parallel independent paths where the execution of tasks in each individual path is not influenced by the execution of tasks in another path and decisions are only influenced by the execution order of tasks on each path. This is true of environments such as sales where a customer may be approached with multiple sales strategies in parallel, and where the offer execution within each individual path is independent of other offers since it is not known a priori which offer a customer is likely to accept. Path independence has an influence on the number of path features that should be extracted from a given process execution trace and the cardinality (i.e., length) of each feature.

For a business process with dependent parallel paths, the entire tokenized process trace is typically encoded as Model A. However, this results in a single path attribute with very high cardinality that uses a complex classifier (e.g., trained machine learning model). A decision tree trained with such a single path attribute will have a very long height. Therefore, it is important to identify path groups that have dependency to each other in a business process with parallel paths. This is because knowing whether a particular path is independent or dependent on others has an impact on the choice of how to represent paths of the business process, which consequently has an impact on the accuracy and efficiency of the prediction method that relies on the path representation.

Another aspect of path dependency is related to process engineering. If there are dependencies between parallel execution paths, then the performance of one path may impact the performance of the other one. Path dependencies must be taken into account to understand the factors that influence performance. Process designers or architects can use dependency information to eliminate bottlenecks, improve execution times and enable efficient allocation of workforce for efficient task execution.

Independent paths are represented by using separate path features, as in Model B. However, for dependent paths, it is also important to determine whether it is worthwhile to model them as dependent. In particular, if representing execution traces corresponding to dependent path groups, as suggested in Model A, with token information does not provide significantly more information, then it may not be worthwhile to take the dependence into account since it significantly increases modeling complexity. For the path groups that are dependent, two path representations are generated in terms of Model A and Model B, and the information gain for each model is calculated. The purpose of calculating information gain is to make sure that representation complexity is not increased unnecessarily by selecting Model A if there is no additional information gain. Even if there is dependency among the parallel paths, the selection module selects Model B if the information gain is comparable (e.g., within a predetermined threshold value).

Independent paths and dependent path groups are identified using the definition of independent events. Two events A and B are independent if and only if their joint probability distribution equals the product of their individual probabilities.

$$\Pr(X \text{ and } Y) = \Pr(X)\Pr(Y) \quad (1)$$

Consider X and Y as path instances. As an example, let $P_1$ and $P_2$ be two parallel path instances, where $P_1 = \{t_{12}, t_{13}, t_{14}\}$ and $P_2 = \{t_{21}, t_{22}, t_{23}, t_{24}\}$. Here, $t_{ij}$ represents the j-th executed task of path i. The two paths, $P_1$ and $P_2$, are independent if and only if the follow equation is satisfied for all instances.

$$\Pr(t_{1i} \text{ and } t_{2i}) = \Pr(t_{1i})\Pr(t_{2i}) \forall i \text{ and } j \quad (2)$$

The individual and joint probabilities used to test independent in equation (2) are estimated from the set of historical execution traces as follows in equation (3) and equation (4) respectively:

$$Pr(t_{1i}) = \frac{\text{All traces that include } t_{1i}}{\text{Total number of traces}} \quad (3)$$

$$Pr(t_{1i} \text{ and } t_{2i}) = \frac{\text{All traces that include } t_{2j} \text{ and } t_{1i} \text{ together}}{\text{Total number of traces}} \quad (4)$$

In general, if there are L parallel paths, then path Q is considered to be independent of other paths if equation (5) holds.

$$\Pr(t_{Qi} \text{ and } t_{kj}) = \Pr(t_{Qi})\Pr(t_{kj}) \forall i, j \text{ and } k \leq L \quad (5)$$

Path representation of Model B is used for all paths that are independent. Each independent path representation is added to the prediction model as a separate feature. The decision of independence is based on how close equation (5) is to equality. Since the probabilities in equations (3) and (4) are estimated from the trace history, exact equality may not be reached. A threshold may be used to determine independence:

$$\|\Pr(t_{Qi} \text{ and } t_{kj}) - \Pr(t_{Qi})\Pr(t_{2j})\| \prec \alpha \Pr(t_{Qi})\Pr(t_{2j}) \quad (6)$$

where $\alpha$ is the threshold for independence. For paths that equation (6) is not satisfied, Model A could be used at a price of increased complexity in the representation. However, due to this increased computational complexity, it is determined if it is worthwhile to use Model A for dependent path groups. Information gain provided by each representation is checked to determine whether Model B performs as good as Model A.

In predictive models, information gain is used to measure how much the uncertainty of the target class to be predicted is reduced by a certain feature. Information gain is used to measure the effectiveness of a particular path representation. Let $I_j(G)$ denote the information gain obtained by employing model j as the path representation model.

$$I_j(G) = H(Y) - H(Y|\text{Path}_j) \text{ where } J = A, B \quad (7)$$

Here, $\text{Path}_j$ is the path representation based on Model J, $H(Y)$ is the entropy of the target Y to be predicted, and H(Y|Path$_j$) is the entropy given that Path$_j$ is the path representation. Entropy of the target class is expressed as:

$$H(Y) = -\sum_{i=1}^{2} p(Y_i)\{\log p(Y_i)\} \text{ where } Y_i \in Y \quad (8)$$

where the target class to be predicted is either Y1 or Y2. If the information gain obtained by using Model B is close to the information gain obtained by Model A, then Model B will perform as good as Model A, although paths are not independent.

Sample complexity in predictive models is a concept related to the amount of training data needed to learn successfully. Predictive models learn a hypothesis, h, in a hypothesis space, H, that fits the training samples best. A hypothesis is a function that maps the set of input values to a target output class. The attributes or features constitute the input space and each training sample is an element of the input space. The cardinality of each feature contributes to the dimension of the hypothesis space. The size of the hypothesis space is the number of all possible functions for a given feature set that maps to the output classes. Hence, if a model has 2 features that take 3 values and the output class is Boolean, then the size of the hypothesis space is found as ‖H‖ is found as $2^9-1$. This is also the size of the truth table. If the hypothesis space is finite, the probability of making true prediction error, that is, mapping a test set to the wrong target, is bounded as follows:

$$P(\text{error} > \epsilon) \leq \|H\| e^{-m\epsilon} \quad (9)$$

where m is the number of training samples and e is the error bound. Equation (9) indicates that when the number of training samples is fixed, the size of the hypothesis space determines the error bound. Therefore, the size of the hypothesis space should be kept as small as possible in order to keep the error bound low. In this section, the impact of path attribute representations is measured on the size of the hypothesis space. This is particularly important in deciding whether it is worthwhile to use Model A when parallel paths are not independent.

In a business process where there are cascading parallel gateways, identifying independently executing parallel paths and the associated path attributes involves tracing the path for every token. This level of detail may not always be available in the historical execution traces. As described above, depending on the details in the execution traces, different representations may be provided for path information. If the token information is available for each parallel execution, and there is a causal relationship between executions on separate paths, then a single path attribute, as in Model A, captures the path information completely. If there is no dependency between parallel paths, however, using a single path attribute as the ordered list of executed tasks with path identifiers will increase the hypothesis space significantly. The dimension of the hypothesis space is directly proportional to the size of the input space defined by the features of the predictive model and their values; therefore, hypothesis space depends on the cardinality of the path attribute.

As an example, if the path attribute has m distinct values and the target class for prediction is Boolean, then the number of additional hypothesis added by the path attribute to the hypothesis space would be $2^m$. Doubling the cardinality of the attribute from m to 2m would exponentially increase the hypothesis space to $2^{2m}$. Since the cardinality of the path attribute in Model A is larger than that of Model B, the corresponding hypothesis space of the predictive model is also larger. When parallel paths are executed independently, execution order across different paths becomes irrelevant for prediction. In this case, only the task execution order within each parallel path becomes relevant as in Model B. This yields a smaller hypothesis space and a simpler model. When there are two models for the same prediction, Occam's razor suggests using the model that has fewer assumptions. Since Model A assumes dependency, Occam's razor suggests using Model B when paths are independent. In general, when the hypothesis space is kept unnecessarily large, under fitting occurs due to lack of sufficient training data.

In order to compare the size of the hypothesis space of Model A and Model B, the cardinality of path attributes in each case should be computed. In the exemplary business model 100 of FIG. 1, after task A, three token are generated. The possible paths that the first token (generated at task B) can travel between the tasks A and K are BEK, BEFK, BFK, BK. Thus, thus path attribute associated with token 1 can take four different values, hence its cardinality is 4. It will be shown that the cardinality of each individual parallel path attribute, i.e., the number of labels used to represent a path attribute, in Model B will be significantly lower than the cardinality of a single path attribute in Model A. In order to compare the complexity of these two models, i.e., the size of the two hypothesis spaces, an approximation is provided for the size of the additional dimensions added to the hypothesis space by each model due to different path representations.

Let $b_j$ denote the number of possible traces for token j in Model B and L denote the total number of tokens (i.e., parallel paths) in the process model. The number of additional dimensions $N_B$ introduced by the path attribute in Model B is found as:

$$N_B = \prod_{i=1}^{L} b_i \quad (10)$$

In the exemplary business process model 100 of FIG. 1, the number of parallel paths is L=3, hence there are 3 tokens. The number of possible different traces for each token is $b_1=4$, $b_2=2$, $b_3=4$ for token 1, 2 and 3 respectively, therefore $N_B=32$. This corresponds to $2^{32}$ additional hypothesis produced for the predictive model by including a path feature using Model B assuming that the target is Boolean. In case of Model A, assume that the number of tasks of each possible trace for token j (there are $b_j$ of them) is the same and denote $x_j$ as the length of the j-th path, i.e., number of tasks executed on path j. Then, the number of additional dimensions added to the hypothesis space, $N_A$, due to parallelism in Model A is found as $$N_A = \psi N_B.$$

where $$\psi = \binom{M}{x_1}\binom{M-x_1-x_2}{x_2} \cdots \binom{M-\sum_{j=1}^{L-1} x_j}{x_L}$$

Here, $M=\Sigma_{i=1}^{L} x_i$ is the length of the path attribute in Model A and ψ gives all possible ways of ordering associated task executions when the path length is M and $x_i$ is the number of tasks on path i. Note that for every instance of Model B, there are ψ ways of generating a new instance in Model A. As an example, if an instance of Model B is $\{P_1, P_2, P_3\} = \{\{ABEK\},$ {ACG}, {ADH}}, then one of many corresponding instances in Model A would be {A, $B_1$, $C_2$, $D_3$, $H_3$, $E_1$, $D_3$, $G_2$}.

If $x_1=x_2=x_3$ is approximated as 3, then $\psi$ is found as 1680. This means that Model A introduces 1680 times more hypotheses dimensions than Model B. In other words, the hypothesis space of Model A will be $2^{1680}$ times more. This is the result of task execution order dependency across parallel paths and certainly impacts the depth of a decision tree for Model A. Since the size of the hypothesis space increases when Model A is selected, more training samples would be needed to train the predictive model for the same performance that can be attained by using Model B, as can be concluded from equation (9).

The decision on which representation model gives better performance depends on two factors. The first is the information gain and the second is the performance of prediction error. For a given number of training samples, Model B will give better prediction error performance provided that associated predicted models are consistent on the training data. Information gain is a measure of consistency on the training data. If the information gain obtained by using Model A is close to the information gain obtained by Model B, then Model B is a better choice. Model A, however, may be more consistent on the training data and may result in higher information gains. In this case, Model A would perform better.

The selection module 226 is configured to select a path representation to represent the execution trace 216 based on the path information determined by the modules of determination module 217. The selection module 226 selects Model E where the only information is the list of executed tasks. The selection module 226 selects Model C where task execution order for each path is available, but task execution order across parallel paths is not available and cannot be estimated. The selection module 226 selects Model D where task execution order for each path is identifiable, however task execution order across parallel paths is not identifiable but can be estimated.

The selection module 226 selects Model B where task execution order for each path is identifiable (but not across parallel paths) and paths are independent. The selection module 226 may select Model A where task execution order for each path is identifiable, task execution order across parallel paths is identifiable, and paths are dependent. However, due to the complexity associated with Model A, it is preferably determined if it is worthwhile to represent dependent path groups as Model A. As such, execution trace 216 of dependent path groups is represented as both Model A and Model B and the information gain for both representations are compared. If the information gain of Model A is greater than Model B, the selection module 226 represents the execution trace 216 of a dependent path group as Model A; otherwise, the execution trace 216 is represented as Model B.

The selected model 230 may be an output 228 of the system 202. In one particularly useful embodiment, the model 230 may be used to train a classifier (e.g., decision tree) for predicting a decision. Other applications of the selected model 230 may also be employed, such as, e.g., computing deviations between separate paths of a business process, clustering business process instances, etc.

As noted above, decision trees may be employed as a classifier to predict the potential future tasks of a process instance. The future tasks of a process instance constitute the target attributes or the output class labels for the classifier. The input data for the classification task is a collection of records about the process including the executed tasks, associated data and the path information. The classifier is trained with the attributes extracted from process execution instances against the observed target values. As a result of this training, the classifier learns how to map the input attribute set, i.e., the execution trace and the associated data, to a target value, i.e., a future task. Decision trees are well suited for non-parametric cases, require little data preparation and are easily interpretable.

A decision tree is a popular machine learning tool that is well suited to non-parametric classification problems. Since the problem is to predict the likelihood of executing a particular task from execution traces that include data and task attributes, using decision trees is appropriate. A decision tree creates a classification model with an input dataset by employing a learning algorithm to identify the model that best fits the relationship between data attributes and target attributes. This learned model should also predict the labels of a target attribute for execution traces that it has never seen before (i.e., never been used for training the tree). Therefore, building models with good generalization is important.

Referring now to FIG. 3, sample training dataset 300 for learning a decision tree for Model B is illustratively depicted in accordance with one embodiment. In order to learn a decision tree model, a training set is provided where the target attribute labels are known. This dataset is used for building the decision tree model. The table 300 shows a sample dataset used for classifying each process instance with the output of executing task I or J for the business process model 100 of FIG. 1. The attribute set includes the data attributes as well as the path attributes as described earlier (table 300 shows multiple path attributes used for Model B). This training set is used to build the decision tree which is subsequently applied to the test dataset that includes records with unknown output labels. The table 300 is also referred to as a truth table. The columns of the table 300 are the attributes of the model. If there are n Boolean attributes, then the maximum number of rows of the truth table is $2^n$. In addition, if the output class is also Boolean, the number of distinct truth tables with $2^n$ rows is $2^{(2^n)}$. This means that there could be $2^{(2^n)}$ distinct decision trees, i.e., Boolean functions which is also known as the size of the hypothesis space. When the hypothesis space is large, more training samples are needed to make an accurate representation.

The predictive quality of a model is measured by its training accuracy and its generalization accuracy. The training accuracy of a tree is defined as the ratio of the number of correct predictions to all predictions in the training dataset. The classification error rate is defined as the compliment of accuracy whereas the generalization error is the expected error of the model on the previous unseen records. A good classifier must fit the training sequence well, in addition to accurately classifying the sequences it has never test before. Classification accuracy computed with respect to the training sequences is called training accuracy, and classification accuracy against the test sequence is call the test accuracy. The training accuracy of a model may increase with more training samples, but this may lower the test accuracy. This is known as the over fitting problem in machine learning. The models that fit the training data too well with low classification errors may have poorer generalization, i.e., higher classification errors in test sequences.

Another performance metric of decision trees is the complexity of the tree. A trained decision tree includes nodes and, without loss of generality, it can be assumed that the number of nodes defines the complexity of a model. A high number of nodes might be cause for many reasons and is not desirable.

Figure 4:
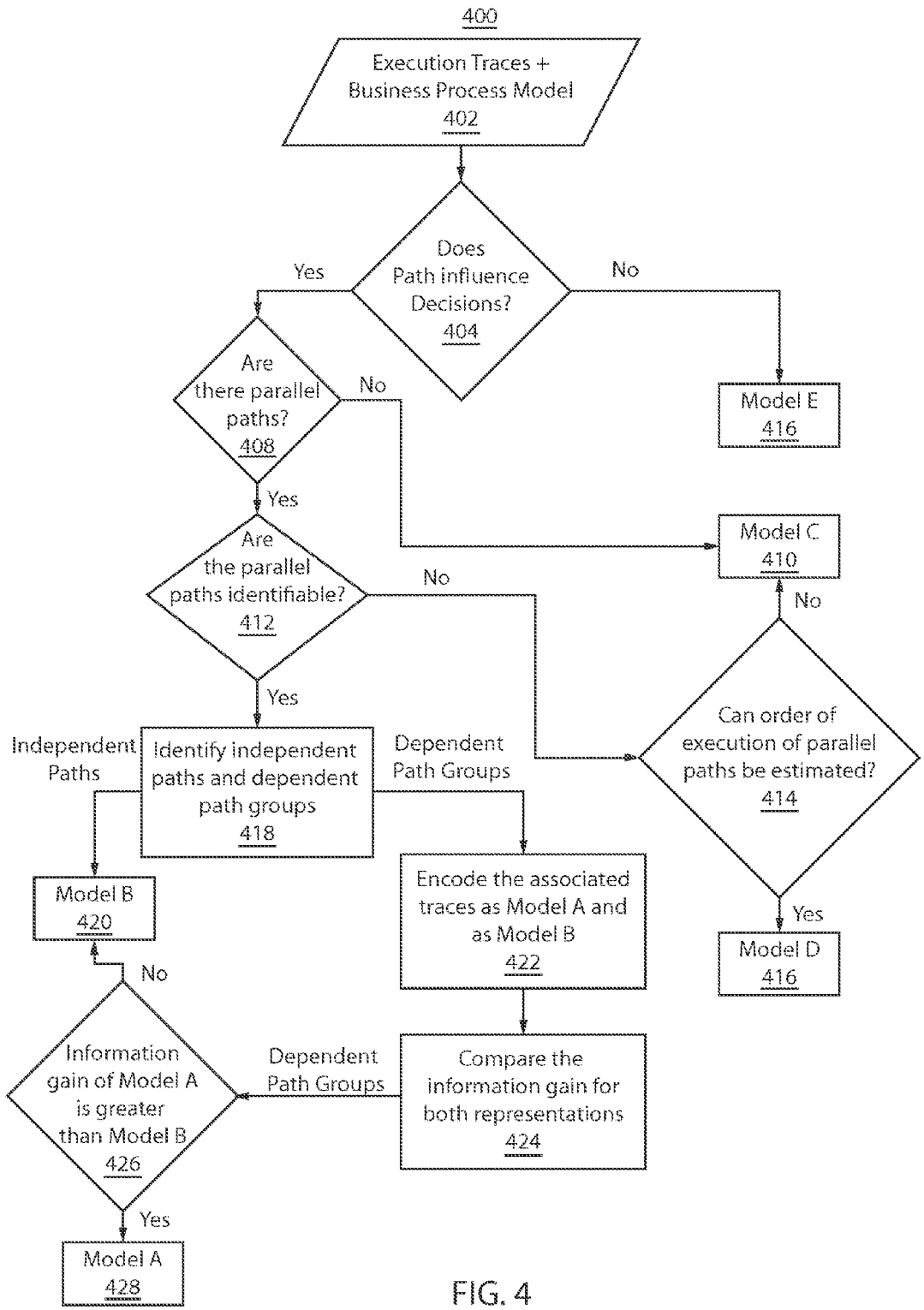
FIG. 4 is a block/flow diagram of a method for determining a model for representing an execution trace, in accordance with one illustrative embodiment.

Referring now to FIG. 4, a block/flow diagram showing a method 400 for selecting an appropriate path representation model for an execution trace is illustratively depicted in accordance with one embodiment. The method 400 may be employed to select a representation of the execution trace to, e.g., train a classifier as a predictive model for making predictions in a business process model, compute the deviation between one or more paths in the business process model, cluster paths of the business process model for characterizing similar and/or disparate behavior, etc.

In block 402, a business process model and an execution trace of the business process model are provided. The business process model may be, e.g., the business process model 100 of FIG. 1. In block 404, it is determined whether the path of the execution trace influences a decision in the business process model. This may be provided as part of a user input. If path does not influence decision, in block 406, the execution trace is represented by encoding each task execution as a Boolean or numeric attribute (Model E). If path does influence decision, in block 408, it is determined if there are parallel paths. If there are no parallel paths, in block 410, the execution trace is represented as a single path attribute without task execution order information, i.e., token information (Model C).

If there are parallel paths, in block 412, it is determined whether the order of execution of tasks on parallel paths are identifiable, e.g., via tokens. In block 414, if there is no task execution order information, it is determined if this task execution order information can be estimated. If task execution order information cannot be estimated, the execution trace is represented as Model C in block 410; otherwise the execution trace is represented as multiple path attributes with estimated task execution order information (Model D) in block 416.

In block 418, if path information of the parallel paths is available, independent paths and dependent path groups are identified. Independent paths are represented as multiple path attributes with task execution order information (Model B) in block 420. In some cases, dependency may not be strong enough to influence the prediction result. Therefore, even if there is dependency, it should be checked if this dependency may impact the final decision. This is important for building effective predictive models, since using path representation that takes into account dependency when dependency does not have significant impact may increase model complexity unnecessarily. Dependent path groups are encoded as both single and multiple path attributes with task execution order information (Model A and Model B) in block 422. The information gain for both representations is compared in block 424. In block 426, if information gain of Model A is greater than Model B, the execution trace is represented as Model A in block 428; otherwise the execution trace is represented as Model B in block 420.

The method 400 for selecting an appropriate path representation model for an execution trace is represented as Pseudocode 1 below, in accordance with one illustrative embodiment.

Pseudocode 1: Selecting the Appropriate Path Representation

```
Input: A business process model PM and an execution trace t₁ of the model.
Output: A methodology to represent the input trace in terms of one of the Models {A-E}.
Assume: paths matter, i.e. influence decisions in the given business process PM and
hence the user wants to determine how to best represent the path in order to train a
machine learning classifier.
if PM contains P paths where the paths influence a decision whose outcome a classifier is
being trained to predict then
    if PM contains K parallel paths, where |K| ≥ 1 then
        if execution order of tasks on the K paths are identifiable via tokens then
            for i = 1 → |K| do
                Determine the set of independent paths, I in K
                Determine the set of dependent paths, D in K.
            end for
            if |I| ≥ 1 then
                /* For independent parallel paths */
                Encode path as instructed by Model B.
            end if
            if |D| ≥ 1 then
                /* For dependent parallel paths */
                Encode the associated traces as Model A and as Model B.
                Compute the information gain, IA(G) and IB(G) for each trace in K of
                Model A and Model B respectively.
                if IA(G) ≥ IB(G) then
                    Use Model A.
                else
                    Use Model B.
                end if
            end if
        else
            /* Execution order of tasks of parallel paths are not identifiable via tokens */
            if Token information can be estimated for K parallel paths then
                Encode paths as Model D.
            else
                Encode each trace as an attribute as instructed by Model C.
            end if
        end if
    else
        /* No parallel paths */
        Encode each trace as an attribute as instructed by Model C.
    end if
else
    Do not encode the path as an attribute. Use Model E, where individual task execution
    is encoded as a Boolean or numerical attributes.
end if
```

Having described preferred embodiments of a system and method leveraging path information to generate predictions for parallel business processes (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for determining a representation of an execution trace, comprising:
    identifying at least one execution trace of a process model, the process model including parallel paths where a path influences an outcome of a decision;
    determining path information of the process model using a hardware processor by injecting at least one token in the process model such that the at least one token traces one or more active nodes representing the path information, the path information including at least one of: task execution order for each parallel path, task execution order across parallel paths, and dependency between parallel paths; and
    selecting a path representation for the at least one execution trace based upon the path information to determine a representation of the at least one execution trace.

2. The method as recited in claim 1, wherein selecting includes representing the at least one execution trace as a single path attribute having the task execution order for each parallel path, where task execution order across parallel paths is not identifiable and the task execution order information across parallel paths cannot be estimated.

3. The method as recited in claim 1, wherein selecting includes representing the at least one execution trace as multiple path attributes having the task execution order for each parallel path, where task execution order across parallel paths is not identifiable and the task execution order information can be estimated.

4. The method as recited in claim 1, wherein selecting includes representing the at least one execution trace as multiple path attributes having the task execution order for each parallel path, where task execution order across parallel paths is not identifiable and paths are independent.

5. The method as recited in claim 1, wherein selecting includes representing the at least one execution trace as a single path attribute having the task execution order across parallel paths, where paths are dependent.

6. The method as recited in claim 1, wherein selecting includes representing the at least one execution trace as multiple path attributes having the task execution order for each parallel path, and as a single path attribute having the task execution order across parallel path, where paths are dependent.

7. The method as recited in claim 6, wherein selecting further comprises comparing an information gain between:
    a representation of the at least one execution trace as multiple path attributes having the task execution order for each parallel path; and
    a representation of the at least one execution trace as the single path attribute having the task execution order across parallel path.

8. The method as recited in claim 7, wherein selecting further comprises representing the at least one execution trace as the representation having a higher information gain.

9. The method as recited in claim 1, further comprising training a predictive model by representing the at least one execution trace with the selected path representation to predict an outcome of the decision in the process model.

10. The method as recited in claim 1, further comprising computing deviation between paths of the process model by representing the at least one execution trace with the selected path representation.

11. The method as recited in claim 1, further comprising clustering paths of the process model by representing the at least one execution trace with the selected path representation.

12. A non-transitory computer readable storage medium comprising a computer readable program for determining a representation of an execution path, wherein the computer readable program when executed on a computer causes the computer to perform the steps of:
    identifying at least one execution trace of a process model, the process model including parallel paths where a path influences an outcome of a decision;
    determining path information of the process model by injecting at least one token in the process model such that the at least one token traces one or more active nodes representing the path information, the path information including at least one of: task execution order for each parallel path, task execution order across parallel paths, and dependency between parallel paths; and
    selecting a path representation for the at least one execution trace based upon the path information to determine a representation of the at least one execution trace.

13. A system for determining a representation of an execution path, comprising:
    a determination module configured to identify at least one execution trace of a process model, the process model including parallel paths where a path influences an outcome of a decision,
    the determination module further configured to determine path information of the process model using a hardware processor by injecting at least one token in the process model such that the at least one token traces one or more active nodes representing the path information, the path information including at least one of: task execution order for each parallel path, task execution order across parallel paths, and dependency between parallel paths; and
    a selection module configured to select a path representation for the at least one execution trace based upon the path information to determine a representation of the at least one execution trace.

14. The system as recited in claim 13, wherein the selection module is further configured to represent the at least one execution trace as a single path attribute having the task execution order for each parallel path, where task execution order across parallel paths is not identifiable and the task execution order information across parallel paths cannot be estimated.

15. The system as recited in claim 13, wherein the selection module is further configured to represent the at least one execution trace as multiple path attributes having the task execution order for each parallel path, where task execution order across parallel paths is not identifiable and the task execution order information can be estimated.

16. The system as recited in claim 13, wherein the selection module is further configured to represent the at least one execution trace as multiple path attributes having the task execution order for each parallel path, where task execution order across parallel paths is not identifiable and paths are independent.

17. The system as recited in claim 13, wherein the selection module is further configured to represent the at least one execution trace as a single path attribute having the task execution order across parallel paths, where paths are dependent.

18. The system as recited in claim 13, wherein the selection module is further configured to:
   represent the at least one execution trace as multiple path attributes having the task execution order for each parallel path, and as a single path attribute having the task execution order across parallel path, where paths are dependent; and
   compare an information gain between:
      a representation of the at least one execution trace as multiple path attributes having the task execution order for each parallel path, and
      a representation of the at least one execution trace as the single path attribute having the task execution order across parallel path.

19. The system as recited in claim 18, wherein the selection module is further configured to represent the at least one execution trace as the representation having a higher information gain.

20. The system as recited in claim 13, wherein the selection module is further configured to train a predictive model by representing the at least one execution trace with the selected path representation to predict an outcome of the decision in the process model.

\* \* \* \* \*